May 18, 1954      P. S. MORGAN      2,678,536

ROTARY PUMP AND MOTOR HYDRAULIC TRANSMISSION

Filed Dec. 30, 1950      8 Sheets-Sheet 1

INVENTOR.
Parker S. Morgan,
BY
Felix A. Russell
ATTORNEY

May 18, 1954  P. S. MORGAN  2,678,536
ROTARY PUMP AND MOTOR HYDRAULIC TRANSMISSION
Filed Dec. 30, 1950  8 Sheets-Sheet 2

INVENTOR.
PORTER S. MORGAN,
BY
Felix A. Russell
ATTORNEY

Patented May 18, 1954

2,678,536

UNITED STATES PATENT OFFICE 2,678,536

ROTARY PUMP AND MOTOR HYDRAULIC TRANSMISSION

Porter S. Morgan, Westport, Conn.

Application December 30, 1950, Serial No. 203,620

10 Claims. (Cl. 60—53)

The present invention relates to a fluid transmission and it consists in the combinations, constructions and arrangements herein described and claimed.

The invention relates to fluid transmissions for changing speeds and converting torque suitable for uses in vehicles such as automobiles, trucks and railroad engines, in earth moving machinery such as bulldozers and the like, or in machine tools such as lathes, drill presses and the like. Because of its lightweight construction, it will be found useful in helicopters, boats and in other craft wherein the lessening of weight is essential.

Generally there is provided a unitary device which is interposed between a drive and a driven shaft. The device is provided with a casing which is rigidly connected with a drive shaft to revolve therewith. The driven shaft extends centrally and longitudinally through the casing and is provided adjacent its inner end with a Z-shaped crank upon which is revolubly mounted a nutating wheel which is provided with a geared connection with the interior of the casing at all times. The nutating wheel is connected by means of connecting rods with a plurality of pistons arranged in parallel relation with the driven shaft in a suitable block forming a part of the interior of the casing and which block provides the necessary cylinders which together with the pistons just mentioned form a fluid motor. A second series of cylinders and pistons is also arranged in the aforesaid block inwardly and in spaced relation to the first mentioned pistons and cylinders and in this case constitutes a fluid pump which is connected through suitable passageways in the block with the fluid motor. The fluid pump is likewise provided with connecting rods which interconnect the pistons of the same with a device which may generally be referred to as a "tilter." This tilter consists of a collar which surrounds the driven shaft and extends from a bracket which is affixed to the vehicle itself outside of the casing and extends inwardly into the interior of the casing where it is provided with a spherical portion which is flattened upon diametrically opposite sides. An inner raceway member is provided with an opening for closely receiving the altered spherical member and is circular upon its outer periphery. An outer raceway member or reaction wheel is revolubly mounted upon the inner raceway member and has interposed therebetween a plurality of ball races. Arms protruding from the outer raceway members are connected to the connecting rods of the fluid pump and a diametrically opposed pair of such arms are provided with extensions which are, in turn, provided with roller bearings which lie between, in each case, pairs of fins which are attached to the inner side of the casing. A control collar is revolubly mounted upon the first-mentioned collar and extends from without the casing where a controlling lever is affixed thereto to a point within the casing where it terminates in a bevel gear. The outer raceway member is provided with an extension which has formed thereon a rack which is enmeshed with the bevel gear and by proper movement of the control lever the tilter will be moved to selected positions to thereby control the ratio of speed between the drive and the driven shaft. In certain positions of the control lever, the apparatus forming the present invention will be in a "neutral" position; in another position of the control lever, the apparatus will be in a "reverse" position; in another position of the control lever, the apparatus will be in "direct drive" position; and in still another position of the control lever, the apparatus will be in an "over-drive" position. Of course, it will be understood that an infinity of conditions may be had in between the positions just mentioned.

It is accordingly an object of the invention to provide means whereby variations of speed and relative torque can be readily obtained by the movement of a simple control means.

One of the principal objects of the invention is the provision of a transmission apparatus which, when in direct drive condition, moves with the drive and driven shafts as a single moving part.

Another object of the invention is the provision, in an apparatus of the character set forth, of novel means for providing "over-drive" without the necessity for additional mechanism therein.

Another object of the invention is the provision of a power transmission system in which the engine may be utilized as a brake and in which the engine may be started by moving the vehicle in which it is installed.

A further object of the invention is to provide a hydraulic pump and a hydraulic motor in which each piston has the dual function of operating not only as a piston but also as both the inlet and the exhaust valve for another associated piston in such pump and/or motor.

A still further object of the invention is the provision, in a device of the character set forth, of a novel nutating wheel forming a part of the invention.

A further object of the invention is the provision, in an apparatus of the character set forth, of a novel reaction wheel forming a part of the invention.

A still further object of the invention is the provision in an apparatus of the character set forth, of novel means for providing fluid connection between a pump and a motor driven by fluid emanating from such pump.

A still further object of the invention is the provision, in an apparatus of the character set forth, of novel control means for such apparatus.

A further object of the invention is the provision, in an apparatus of the character set forth, of novel means for returning hydraulic fluid to a casing from a housing into which such fluid may leak.

A further object of the invention is the provision, in an apparatus of the character set forth, of novel means for supplying "over-drive" without the necessity for adding extraneous mechanisms.

Still another object of the invention is the provision of an apparatus of the character set forth which may be easily controlled through servo mechanisms from remote positions.

Other and further objects of the invention will become apparent from a reading of the following specification taken in conjunction with the drawings, in which:

Figure 3 is a view similar to Figure 1, somewhat reduced, and showing the apparatus in "reverse" condition.

Referring more particularly to the drawings, there is shown therein a casing 10, a portion 11 of which forms a flywheel and to which flywheel is affixed by means of bolts 12 or the like a bell 13 which is formed integrally with a drive shaft 14. A driven shaft 15 extends centrally and longitudinally into the casing 10 and is maintained in position by ball races 16 and 17 in which it is revolubly mounted.

At what may be termed the "motor end" of the casing and adjacent the bearing 16, the shaft 15 is provided with a Z-shaped portion 18 upon which is revolubly mounted a nutating wheel 19 which is provided with a hub 20 having enlarged portions 21 at either end thereof for the reception of ball races 22. One side of the nutating wheel 19 has formed thereon a bevel gear 23 which is enmeshed with a bevel 24 which is affixed to the interior of the casing and which is in concentric relation with the shaft 15.

At what may be termed the "pump end" of the casing, that is to say that end of the casing opposite to which is enclosed the nutating wheel 19, there is provided a "tilter" generally designated at 25.

Figure 2:
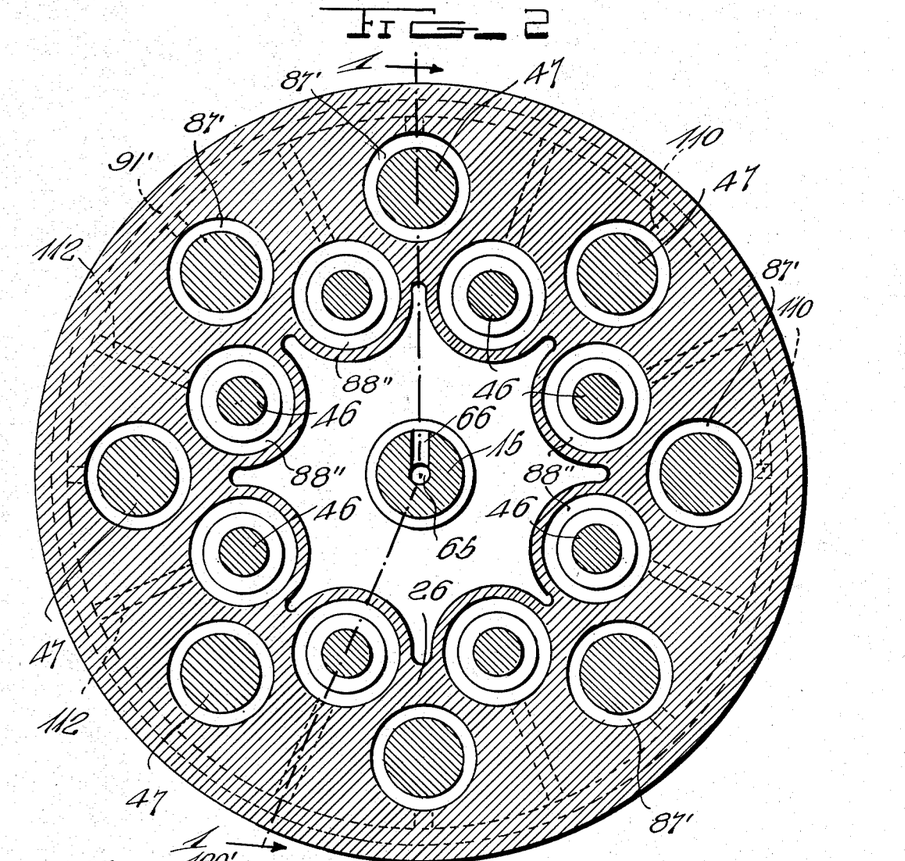
Figure 2 is an enlarged sectional view taken substantially along line 2—2 of Figure 1.

In the medial portion of the casing 10, the same is inwardly and radially enlarged to provide a cylinder block 26 containing eight longitudinally extending cylinders 27 which are spaced circumferentially from one another and which are closed at that end thereof adjacent the pump end of the casing, as indicated at 28. The block 26 also contains eight cylinders 29 which are likewise spaced circumferentially from one another and which extend in a longitudinal direction. The cylinders 29 are closed at those ends thereof which are adjacent the pump end of the casing 10, as indicated at 30 and the cylinders 29 are also interposed between the cylinders 27 and are situate closer to the shaft 15 than the cylinders 27 as will be clearly seen in Figure 2 of the drawings.

A fixed stationary member 31 which will hereinafter be termed the "reaction fulcrum" is affixed by means of bolts 32 or the like to a housing 33 which, in turn, is affixed to the vehicle or the like in which the present apparatus may be installed. The reaction fulcrum 31 encompasses the ball races 17 which, as aforesaid, act to support the driven shaft 15.

Figure 7:
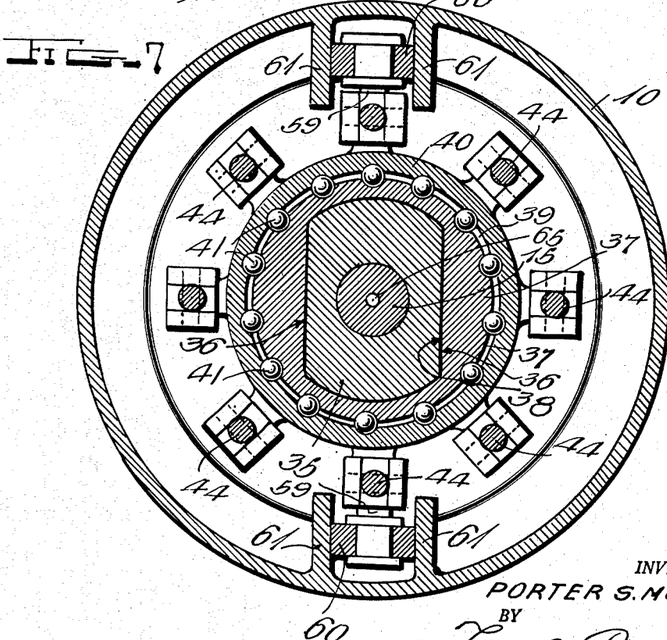
Figure 7 is an enlarged sectional view taken along line 7—7 of Figure 6.

The reaction fulcrum 31 is positioned without the casing 10 and is provided with an integrally formed sleeve 34 which surrounds the shaft 15 and extends into the casing 10 and terminates substantially midway of the length of the casing 10. The collar 34 is provided with a preferably integrally formed spherical portion 35 which is cut away at diametrically opposed points to form flattened surfaces 36, as clearly shown in Figure 7. An inner raceway tilter member 37 is provided with an opening 38 which is designed to closely receive therein the bulged portion 35 and the member 37 is provided with a circular outer periphery, as indicated at 39. The member 37 may be formed, if desired, in two portions which may be thereafter joined together by bolts or the like or in any other suitable manner. It will be apparent that the member 37 may be revolved upon the bulged portion 35 in either a clockwise or counterclockwise direction as viewed in Figure 1.

An outer tilter member 40 is revolubly mounted upon the inner member 37 by means of ball races 41 and the member 40 will be hereinafter termed the "reaction wheel."

Emanating from the outer periphery of the reaction wheel 40 in spaced relation to one another is a plurality of arms 42 which, in the present embodiment of the invention, are eight in number. Each of the arms 42 has a pivot connection 43 with a connecting rod 44 which extends into an adjacent cylinder 29 and is, in turn, connected by a ball and socket joint 45 with a piston 46 reciprocally mounted in the cylinder 29.

Each cylinder 27 has reciprocally mounted therein a piston 47 and a ball and socket joint 48 connects the same, through the open end of the cylinder 27, with a connecting rod 49 and each of the connecting rods 49 is, in turn, connected by means of a pivot joint 50 in spaced relation with the nutating wheel 19.

Figure 6:
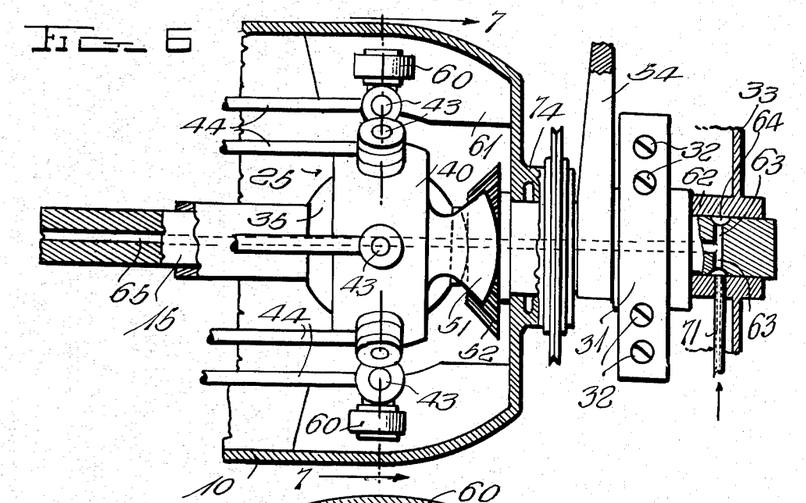
Figure 6 is an enlarged fragmentary sectional view, partly in elevation, of the apparatus as it appears in "direct drive" condition.

Affixed to and preferably formed integral with the member 37 is a gear segment 51 (see Figure 6) which is enmeshed with a bevel gear 52 which is, in turn, formed integrally with a collar 53 which encircles the collar 34 and extends through the pump end of the casing 10 and terminates in an outwardly extending lever 54. The lever 54 extends through an opening 55 provided in the housing 33 and is provided in its outer end with a spring actuated latch member 56 which coacts with a latching bar 57 affixed by means of bolts 58 or the like to the body of the vehicle or other device in which the present apparatus may be placed, as indicated at 58a.

Two of the arms 42 which are diametrically opposed to each other are provided with extensions 59 each of which has mounted adjacent its outer end a roller bearing 60. The casing 10 is provided with two pairs of inwardly extending guide plates 61, each pair being located at diametrically opposed points upon the inner side of the casing 10 and each pair being adapted to accommodate one of the roller bearings 60, as clearly shown in Figure 7.

The driven shaft 15 extends through a journal block 62 formed centrally in the housing 33 and that portion of the driven shaft 15 which is embraced by the block 62 is provided with a plurality of radially extending passageways 63 which communicate with an annular groove 64 in the outer portion of the shaft 15. A centrally disposed and longitudinally extending passageway 65 extends inwardly from the central terminations of the passageways 63 to communicate with a radial passageway 66 formed in the shaft 15 at approximately its medial portion within the casing 10.

A pump 67 is affixed to the stationary member 31 by means of a bracket 68 and is provided with an intake pipe 69 which extends downwardly to a point adjacent the bottom of a well 70 formed in the housing 33. The pump 67 is also provided with an outlet pipe 71 which is, in turn, extended through the block 62 to communicate with the annular groove 64.

The pump 67 is provided with a shaft 72 having a pulley 73 affixed thereto and a reduced portion 74 of the casing 10 has affixed thereto a pulley 75. The pulleys 73 and 75 are interconnected by means of a belt 76.

A small check valve 77 may be positioned in the closed end of one or more of the cylinders 27. The pistons 47 each form with the closed ends of the cylinder 27 a chamber 78 and, likewise, the pistons 46 form with the closed ends 30 of the cylinders 29, chambers 79. While the apparatus is activated, oil or other hydraulic fluid is drawn into and forced out of the chambers 78 and 79 by the pistons 47 and 46, respectively, without the use of additional valves heretofore employed in other types of hydraulic pumps and motors.

Figures 8, 9:
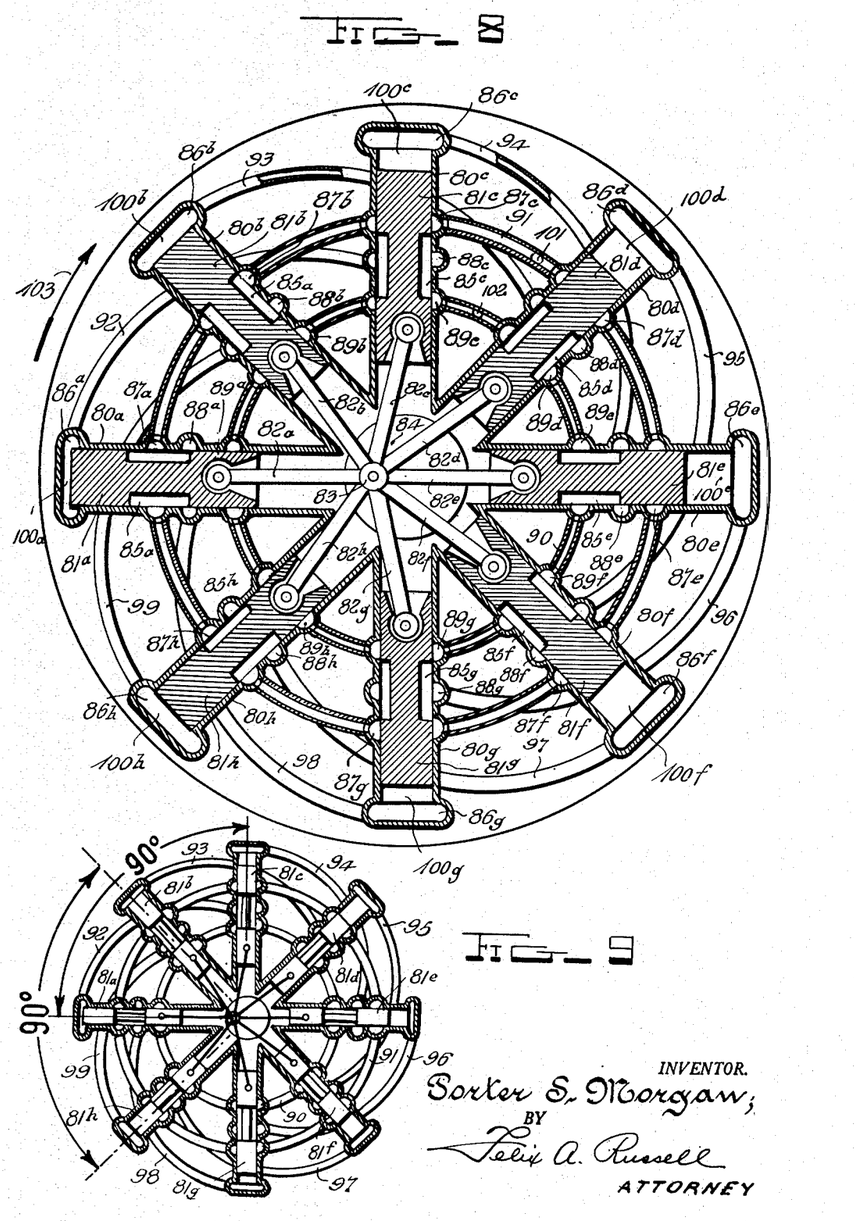
Figure 8 is a transverse sectional view of a modified form of motor or pump constructed in accordance with the teachings of this invention and which can be used as illustrative of the motor portion and pump portion of the invention as illustrated in Figures 1 to 7, inclusive.
Figure 9 is a reduced view similar to Figure 8 but further illustrating the operation of the apparatus as shown in Figure 8.

In order to fully understand the port valve action which takes place between the group of cylinders 27 and the group of cylinders 29, reference is now made to Figures 8 and 9 of the drawings which also show an alternative embodiment of the hydraulic means employed in the present invention. In Figures 8 and 9 there is shown an eight-cylinder radial type pump or motor in which each piston is connected to a common crank. It will be seen that eight cylinders 80a, 80b, 80c, 80d, 80e, 80f, 80g and 80h are respectively supplied with pistons 81a, 81b, 81c, 81d, 81e, 81f, 81g and 81h which are each connected by means of connecting rods 82a, 82b, 82c, 82d, 82e, 82f, 82g and 82h, respectively, to a crank 83 formed in a shaft 84.

Each of the pistons 81a, etc. is respectively provided with a reduced portion 85a, 85b, 85c, 85d, 85e, 85f, 85g and 85h. The cylinder 80a is provided with annular grooves 86a, 87a, 88a and 89a; the cylinder 80b is provided with like annular grooves 86b, 87b, 88b and 89b; the cylinder 80c is provided with annular grooves 86c, 87c, 88c and 89c; the cylinder 80d is provided with like annular grooves 86d, 87d, 88d and 89d; the cylinder 80e is provided with like annular grooves 86e, 87e, 88e and 89e; the cylinder 80f is provided with like annular grooves 86f, 87f, 88f and 89f; the cylinder 80g is provided with like annular grooves 86g, 87g, 88g and 89g and the cylinder 80h is provided with like annular grooves 86h, 87h, 88h and 89h. A circular pipe line 90 which is concentric with the shaft 84 interconnects all of the grooves 89a, 89b, 89c, 89d, 89e, 89f, 89g and 89h and an outer circular pipe line 91 which is concentric with the pipe line 90 and the shaft 84, interconnects all of the grooves 87a, 87b, 87c, 87d, 87e, 87f, 87g and 87h.

The groove 86a is connected by means of a pipe 92 with the groove 88c; the groove 86b is connected by a pipe 93 with a groove 88d; the groove 86c is connected by means of a pipe 94 with the groove 88e; the groove 86d is connected by means of a pipe 95 with the groove 88f; the groove 86e is connected by means of a pipe 96 with the groove 88g; the groove 86f is connected by means of a pipe 97 with the groove 88h; the groove 86g is connected by means of a pipe 98 with the groove 88a and the groove 86h is connected by means of a pipe 99 with the groove 88b. It will be noted that the cylinders thus connected in each case have their longitudinal axes perpendicular to each other or, regarding the circular aspects of the motor—pump thus shown in Figures 8 and 9, those cylinders which are 90° apart have thus interconnected by the pipes 92, 93, etc.

In the position of the motor or pump shown, for example, in Figure 8, it will be observed that the connecting rods 82a and 82e are in alignment with each other. In this condition it is to be observed that the reduced portions 85c and 85g are exactly centered between the ports 87c and 89c and the ports 87g and 89g, respectively, and it will further be observed that the pistons 81a and 81e are momentarily at their dead center and are at rest and that therefore hydraulic fluid in the chambers 100a and 100e is neither being forced into or drawn out of such chambers. It is therefore safe to block the inlets and outlets of the chambers 100a and 100e by the positions of the pistons 81a and 81e, respectively, which pistons have for a very small interval of time sealed the escape of fluid from the annular grooves 89c and 88g. At this moment, however, the pistons 81c and 81g are travelling at their highest radial velocity. At this time it should be mentioned that the pipe line 91 is provided with an inlet or outlet port 101 and the pipe line 90 is provided with an inlet or outlet port 102.

Considering that the motor or pump shown in

Figure 8, for example, is rotating in the direction of the arrow 103 and that the shaft 84 is stationary, it will be seen that in one-eighth of a revolution of the motor-pump or a 45° rotation thereof that the piston 81g will assume the presently shown position of piston 81h. This movement will unlock the annular groove 88h associated with the piston 81h because the reduced portion 85h has made a direct connection between the groove 88h and the groove 87h which, in turn, connects with the pipe line 91.

During this same cycle of 45° travel, the piston 81e will assume the present position of the piston 81f and the fluid in the chamber 100f will find an outlet through the groove 86f, thence through the pipe 97 and into the groove 88h and thence into the pipe line 91. During this partial cycle of rotation just described, the piston 81f will assume the position presently occupied by the piston 81g and hydraulic fluid entrapped in the chamber 100g will find its outlet in the groove 88a associated with the piston 81a and thence pass through the reduced portion 85a and into the groove 87a and finally into the pipe line 91. In like manner, the fluid trapped in the chamber 100h will find its way to the pipe line 91. Again, during the cycle aforesaid, the piston 81h will assume the position now shown for piston 81a. As the latter is on dead center as previously explained there will be no movement of the hydraulic fluid trapped in the chamber 100a. Pursuing this same 45° cycle of rotation, the piston 81a will assume the present position of the piston 81b which is now beginning to move inwardly toward the common center. It is therefore drawing fluid into the chamber 100b which obtains its supply of fluid through the pipe 93 due to the fact that the groove 88d associated with piston 81d is now opened to communication with the pipe line 90. In like manner, the chamber 100c is connected to the pipe line 90 through the behavior of the piston 81e and likewise the chamber 100d will be supplied through the behavior of the piston 81f.

During the actions just above described, it will be apparent that the pipe line 90 acted as the supply line while the pipe line 91 acted as the outlet pipe for the various cylinders. If, now, the direction of rotation of the apparatus be reversed to that shown by the arrow 103, it will be seen that the pipe line 91 will become the supply line while the pipe line 90 will become the outlet pipe. It will also be apparent that if the body of the apparatus is held stationary and the crank pin 83 allowed to revolve in either direction, that the action will be relatively the same.

It will be seen that if the crank pin 83 is held stationary and hydraulic fluid is admitted through the port 101 and thence into the pipe line 91 that the apparatus will function as a hydraulic motor revolving its block in a direction opposite to that of the arrow 103. If, however, the pipe line 90 becomes the high pressure side of the apparatus through admission of fluid through the port 102 and the crank 83 held in fixed position, the cylinder block will thence rotate in the direction of the arrow 103.

Figure 1:
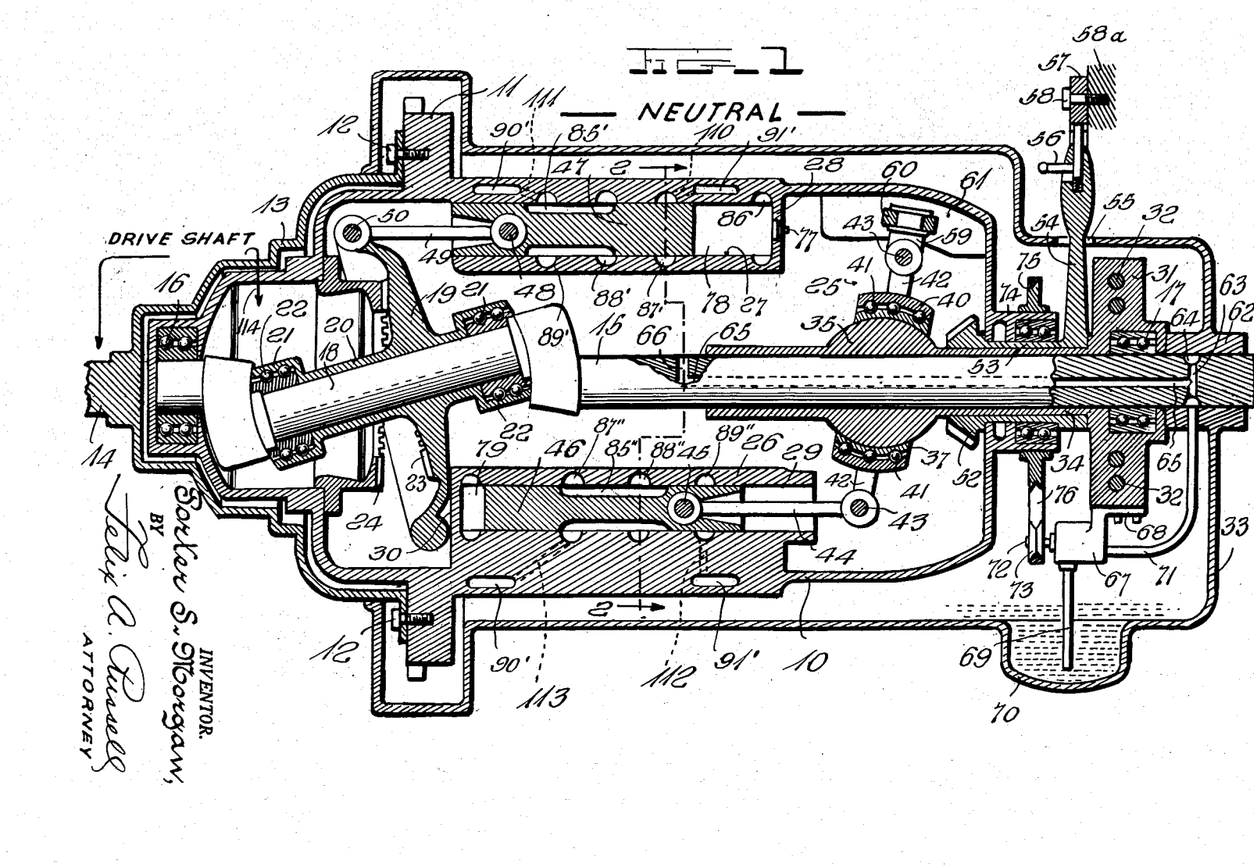
Figure 1 is a longitudinal sectional view of an embodiment of the apparatus shown partly in elevation and partly broken away, and taken substantially along line 1—1 of Figure 2, and showing the apparatus in "neutral" condition.
Figure 10:
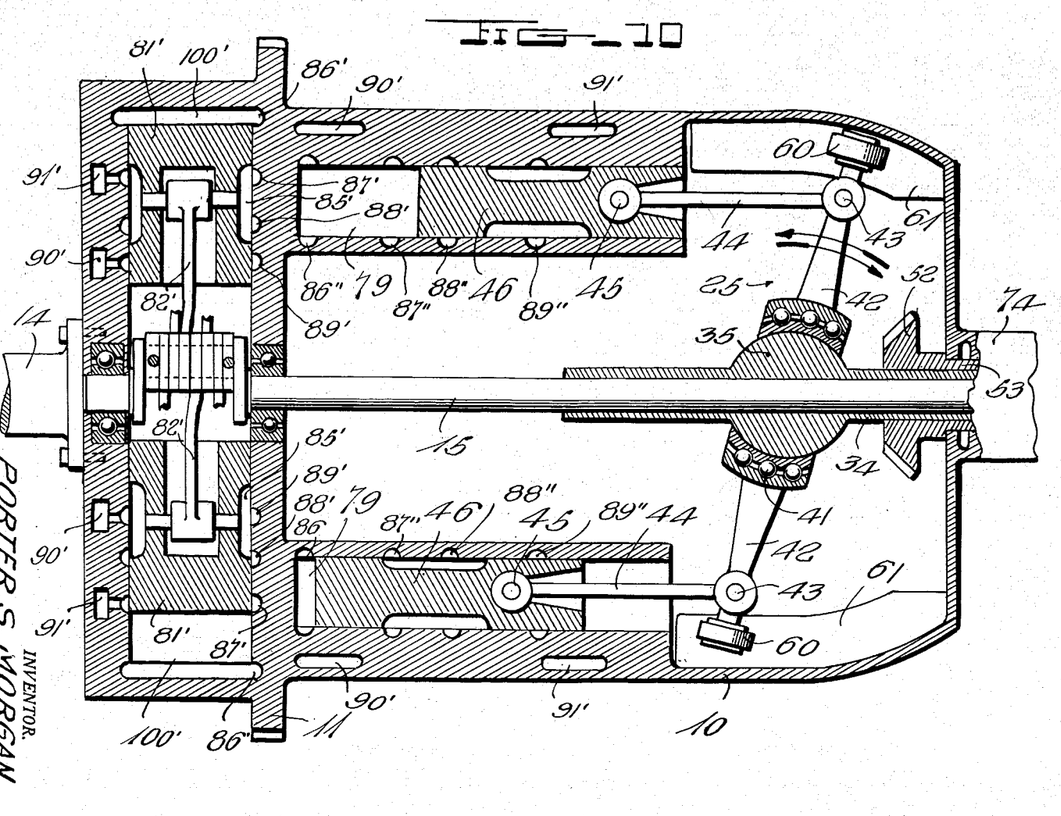
Figure 10 is a view similar to Figure 1 but showing a further modified form the invention may assume.
Figure 11:
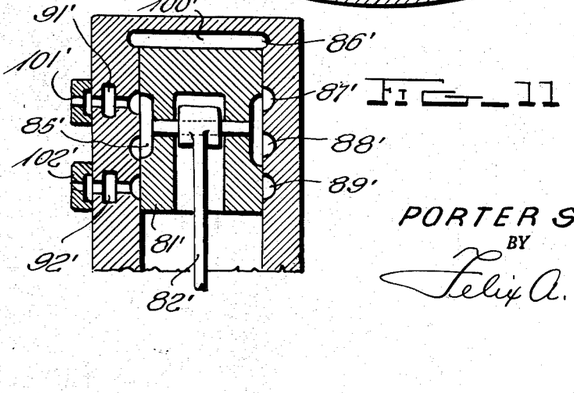
Figure 11 is a fragmentary sectional view of the apparatus illustrated in Figure 10 but showing a still further minor modification thereof.

In Figure 10 there is shown a further modification of the invention in which the radial piston construction shown in Figure 8 replaces the nutating wheel 19 of the apparatus, as shown, for example, in Figure 1 of the drawings. The reaction wheel 40 with its component parts including the tilting means 25 are identical in the apparatus shown in Figure 10 with the apparatus shown, for example, in Figure 1. The preferred form of the invention is illustrated by that form shown, for example, in Figure 1 but it is believed that the device shown in Figure 8 by way of example clarifies the action particularly when the form shown in Figure 8 is substituted for the nutating wheel and its component parts as illustrated in Figure 10.

The method of valve porting described with reference to Figure 8 is identical in the radial motor portion of the device shown in Figure 10 and it will be apparent that the nutating wheel 19 in Fig. 1 is but another form of crank action but which, however, has structural advantages not found in the form of the invention shown in Figure 8.

Referring now to Figures 1 to 5, inclusive, 90' and 91' constitute circular grooves which are concentric with the shaft 15 and correspond in their functions with supply pipes 90 and 91, respectively. Annular grooves 86', 87', 88' and 89' correspond respectively to the annular grooves 86a, 87a, 88a and 89a, etc. shown in Figure 8 and function in an identical manner therewith. It will be seen that the eight annular grooves 87' are connected with the circular passageway 91' as shown in dotted lines, at 110 and it will also be seen that the circular passageway 90' is connected with the eight annular grooves 89' by means of ducts as shown in dotted lines at 111.

Likewise, the nutating wheel 19 and its corresponding cylinders 29 function through their corresponding ports and grooves in an identical manner. In this case, however, the annular grooves 89'' are connected to the supply port 91' while the grooves 87'' are connected with the supply ports 93', as shown in dotted lines at 112 and 113, respectively, and, similarly to the structure shown in Figure 8, the grooves 88' are each connected to a groove 86'' of a piston located 90° away.

The operation of the apparatus as disclosed in Figures 1 to 5, inclusive, is as follows: referring to Figure 1, if the casing 10 is revolving in the direction of the arrow 114 and the driven shaft 15 is held against rotation, then the crank 18 will remain fixed in the position shown while the nutating wheel 19, because of the connection between the gears 23 and 24, will revolve around the crank 18 in the position shown. Assuming the interior of the casing 10 to be suitably filled with a replenishing supply of hydraulic fluid, and also assuming that all of the passages and grooves heretofore described are initially filled with hydraulic fluid, then each time the casing 10 makes a complete revolution, each piston 47 will relatively reciprocate one time and, during the compression cycle, each of the pistons 47 will discharge or try to discharge the fluid trapped in the chambers 78 into the annular groove 91' and at the same time, during the suction cycle, each piston 47 will draw in or attempt to draw in fluid from the annular groove 90'. It is therefore self-evident that the annular groove 91' must have an outlet for the fluid forced thereinto and that the annular groove 90' must have an inlet or a source of fluid.

In Figure 1 the apparatus is shown as being in "neutral" position. In this particular position the capacity of volumetric displacement of the pistons 47 is absolutely equal to the volumetric displacement of the pistons 46 or, in other words, the capacity of the pump constituted by the pistons 46 and their cylinders and the motor constituted by the pistons 47 and their cylinders is the same. Therefore, all of the fluid that is pumped by the pistons 47 is received in full measure but no more and no less by the eight pistons 46 and, in turn, all of the fluid which is pumped by the eight pistons 46 is received in full measure—no more and no less by the eight pistons 47 and their respective cylinders. It is obvious, therefore, that when the tilter 25 is in the position shown in Figure 1 of the drawings that the driven shaft 15 will remain stationary regardless of the speed of rotation of the drive shaft 14.

The check valves 77 which may be one or more in number are for the purpose of admitting such fluid as may be necessary for the interior of the casing 10. The casing 10 is not necessarily completely filled with fluid but preferably an air core is left for expansion or compression. The housing 33 surrounds the entire apparatus with the exception of the bell 13 and drive shaft 14 and is provided with a well 70 within which may be collected such hydraulic fluid as may leak from time to time from the casing 10 and its allied apparatus. This collected fluid may be returned to the interior of the casing by means of the pump 67 which is operated by the rotation of the casing 10 through the pulleys 75 and 73 and belt 76 whereby fluid is drawn into the intake pipe 69 to the pump 67 and discharged into the pipe 71 which then delivers such fluid to the annular groove 64 where it passes through the radial opening 63 into the opening 65 in the shaft 15 and from whence it is finally discharged into the casing 10 through the passageway 66.

Figure 4:
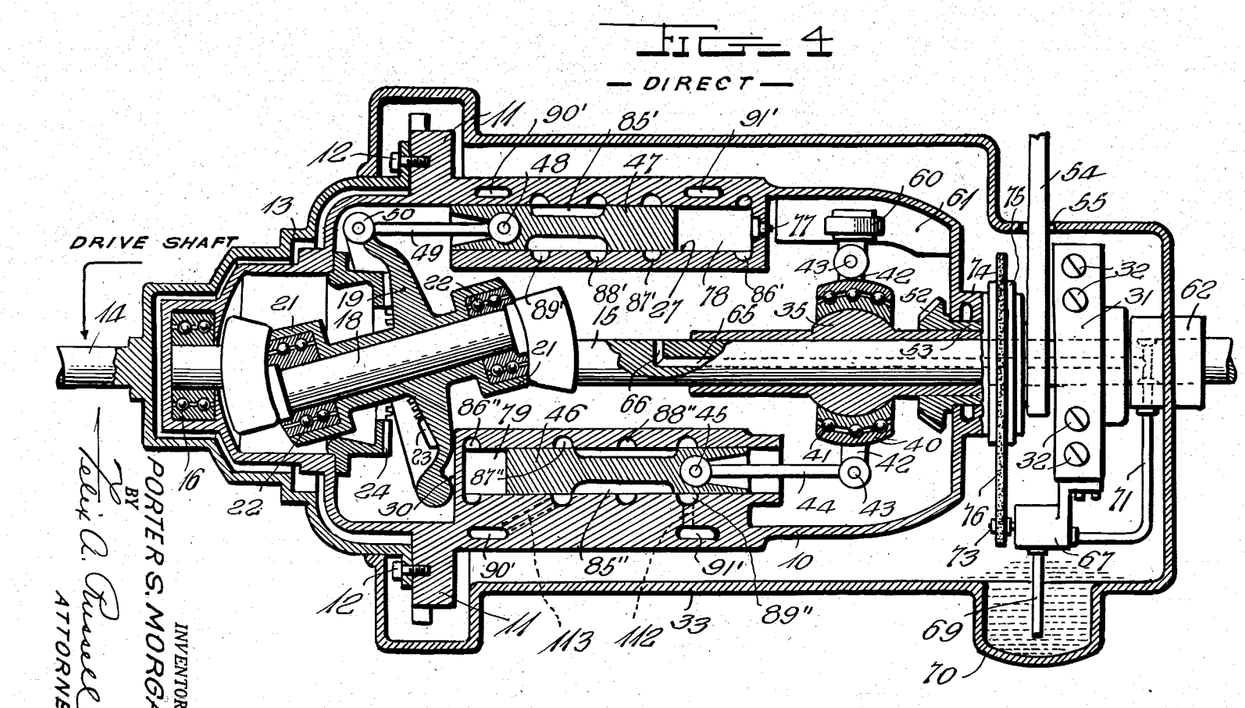
Figure 4 is a reduced view similar to Figure 1 but showing the apparatus in "direct drive" condition.

Referring now to Figure 4 of the drawings, it will be seen that the same is now in position for direct drive. In this position the reaction wheel 49 is rotating on the same axis as the driven shaft 15 and there is no fluid being pumped or allowed to be received by the group of pistons 46 and their respective cylinders. Therefore, the fluid contained by the immediate piston group 47 and its cylinders 27 is provided with no outlet. It therefore locks the pistons and carries the Z-crank 18 around at the same speed as drive shaft 14 and the whole transmission revolves as one unit in direct drive or one-to-one ratio.

Figure 5:
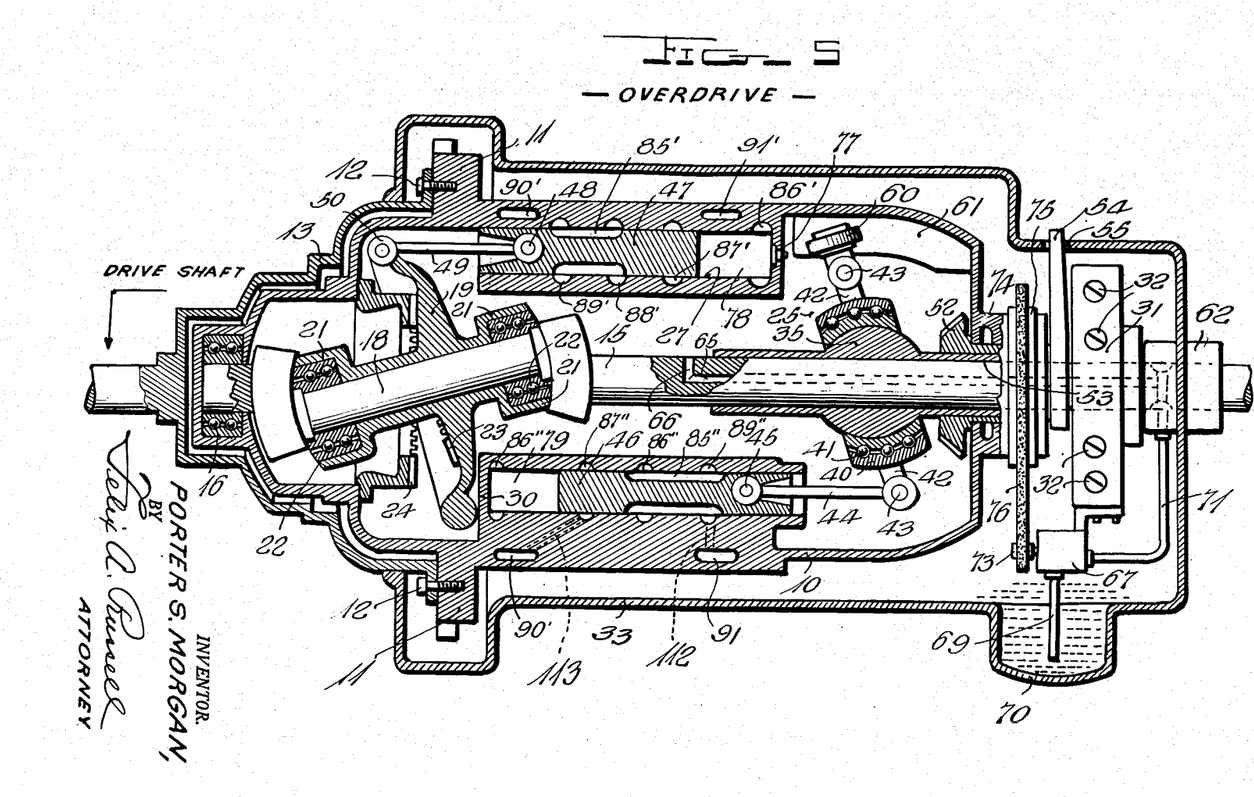
Figure 5 is a reduced view similar to Figure 1 but showing the apparatus in "over-drive" condition.

Referring now to Figure 5 of the drawings, it will be noted that the apparatus is now shown in "over-drive" position. This condition is sometimes termed "overdirect" drive. It will be noted that the farther to the right that the bottom part of the wheel 49 is moved, as viewed in Figure 5, the greater will be the overdrive but, of course, overdrive will be experienced whenever the bottom of the wheel 49, as viewed in Figure 5, is to the right of a vertical line in such figure. When the tilter 25 causes the reaction wheel 49 to accept the tilt or dish as shown in Figure 5 then, instead of the pump piston group 46 receiving fluid from the motor piston group 47 as was explained when the apparatus was in neutral position, the pump piston group 46 forces fluid in the opposite direction or into the annular groove 91'. Both piston groups are now discharging or trying to discharge into the annular groove 91' and, since something has to yield, the piston group 47 will start to operate as a motor thus nutating the wheel 19 and rotating the driven shaft 15 at a greater speed and in the same direction of the casing 10 and drive shaft 14. It should be borne in mind that there are two means of rotating the driven shaft 15. One is to carry the whole driven shaft around by locking the nutating or wobble action of the wheel 19 and the other is by nutating or wobbling the wheel 19. In other words, if the casing 10 is held from rotation and fluid forced by external means into the annular groove 91', the eight pistons 47 and their cylinders constitute a hydraulic motor in performance and will nutate or wobble the wheel 19 and rotate the driven shaft 15. It is clear, therefore, that when the casing 10 is revolving as in the direction of the arrow 114 in Figure 1 and the pistons 47 are also revolving the driven shaft 15 by nutating the wheel 19, that the driven shaft 15 assumes a speed equivalent to the addition of both of these driving forces.

Now, referring to Figure 3, it will be seen that the apparatus is now shown as being in "reverse" condition. Under these circumstances, the reaction wheel 49 is tilted so far that the piston group 46 becomes a pump of greater capacity than the motor piston group 47 and discharges its fluid now into the annular groove 90'. As heretofore explained in regard to the showing of the invention illustrated in Figure 8 of the drawings, when the pressures in the grooves 90' and 91' are reversed, the direction of the hydraulic motor action is also reversed. In this case, illustrated in Figure 3, the wheel 19 is made to nutate or wobble faster in the opposite direction than the casing 10 is revolving in the other direction. It will readily be seen, therefore, that the direction of flow is one way or the other depending upon which side of the center line drawn through the tilter 25 perpendicularly to the driven shaft 15 is dished or tilted. It will also be seen that all speeds between zero and direct drive are found between the position of the apparatus shown in Figure 1 and the position of the apparatus shown in Figure 4 and that all speeds greater than direct drive are found between the position of the apparatus as shown in Figure 4 and the position of the apparatus shown in Figure 5, and that, furthermore, all reverse speeds are found between the position shown in Figure 1 and the position of the apparatus as shown in Figure 3.

The casing 10 is revolving in the direction of the arrow 114 in Figure 1 and a rotative resistance is applied to the driven shaft 15. This causes the motor composed of the pistons 47 and their associated cylinders to either freely pump fluid as previously described with respect to neutral position (Fig. 1), imposing little or no driving torque on the propeller shaft or driven shaft 15 or to pump fluid in varying degrees of resistance imposing torque on the shaft 15 in proportion to that resistance and utilizing the fluid pumped under pressure to operate the hydraulic pump composed of the pistons 43 and their associated cylinders, the hydraulic pump thus giving off its energy in the form of torque applied to the reaction wheel 49 which, in turn, reduces the load on the prime mover through the casing 10.

The eight-cylinder groups as arranged in this embodiment of the invention produce a very uniform flow of fluid. It may prove expedient, however, to incorporate a small air pocket or other yielding means in the hydraulic fluid line between one group and the other to absorb vibration, and it will be quite apparent that the invention is not limited to the use of eight pistons since other combinations of pistons may be used so long as each piston can be teamed up or connected with another piston and its associated cylinder 90° away as heretofore explained. It is also evident that the mating pistons and cylinders can either be 90° ahead of or 90° behind each other.

There is shown a lever 54 for controlling the tilter 25. It will be apparent that as the lever 54 is rotated either clockwise or counterclockwise about the shaft 15 as a center, that the bevel gear 52 will likewise be rotated. This will cause, through the gear connection between the gear 52 and the segment 51, a corresponding rotative movement of the tilter 25 and its associated parts around the bulged portion 35, as viewed, for example, in Figures 1, 3, 4 and 5. The tilter is prevented from rotation relative to the casing 10 by the encompassing of the extended arms 59 and their rollers 60 between the plates 61. A latch mechanism has been shown at 56 and 57 to merely illustrate that the lever 54 may be latched in selected positions. It will be apparent, however, that the lever 54 may be moved by remote control through the use of servomotors or the like. Other desirable variations may be imparted to the movement of the lever 54 through the action of an accelerator pedal. It will also be apparent that the apparatus may be designed in perfect balance at all times by the addition of mass to counterbalance the nutating action of the wheel 19 and the varying positions of the pistons 46 and 47.

It will likewise be apparent that the reduced portions of the pistons may be reduced in size with respect to their longitudinal dimensions in which event additional or "starter" valves may be utilized when such reduced portions lie between certain of the annular grooves in the respective cylinders and that, in such case, such "starter" valves may be operated by the revolutions of the driven shaft 15.

While only the preferred embodiments of the invention have been shown and described herein, it will be readily apparent to those skilled in the art that many minor modifications may be made without departing from the spirit of the invention or the scope of the appended claims.

What is claimed is:

1. An apparatus of the character described comprising a casing, a drive shaft affixed to one end of said casing, a driven shaft extending inwardly through the other end of the casing and journaled in that end thereof to which the drive shaft is affixed, said drive and driven shafts being in axial alignment, a Z-shaped crank formed in the driven shaft adjacent the inner end thereof, a nutating wheel revolubly mounted on said crank, a gear wheel affixed to said nutating wheel, a ring gear affixed to said housing and enmeshed with the gear wheel of said nutating wheel, a block extending inwardly from the central portion of said casing, a fluid motor having a plurality of cylinders formed in spaced circumferential relation in said block, a piston in each of said cylinders, said cylinders each having a longitudinal axis parallel to the longitudinal axes of said shafts and casing, connecting rods interconnecting each of said pistons with spaced peripheral portions of said nutating wheel, a fluid pump having a plurality of pump cylinders formed in spaced circumferential relation in said block, a pump piston in each of said pump cylinders, a reaction wheel revolubly mounted to rotate coincidentally with said casing on said driven shaft, connecting rods interconnecting said reaction wheel and said pump pistons, said pump cylinders being positioned between and inwardly of the cylinders of the fluid motor and each likewise having its longitudinal axis parallel to the longitudinal axes of the shafts and casing, said block having passageways for fluid connection between the pump and motor, regulating means in said casing for controlling the flow of fluid between said pump and said motor whereby to regulate the ratio of speed and the direction of rotation between the drive and the driven shafts, and control means exterior of said casing for controlling said regulating means.

2. An apparatus as in claim 1 wherein said regulating means comprises an elongated collar surrounding the driven shaft and fixed against rotation exteriorly of said casing and extending inwardly of said casing, an enlarged spherical portion in said collar having a pair of diametrically opposed flattened areas, an inner ring having an opening therein snugly receiving the spherical portion including said flattened areas, an outer ring revoluble upon the inner ring, ball races interposed between the inner and outer rings, a plurality of spaced outwardly extending arms affixed to said outer ring, a connecting rod interconnecting each of said arms with a piston of the fluid pump, a pair of diametrically opposed extensions each affixed to one of said arms, a roller mounted on each extension, a pair of guide fins for each of said rollers, said guide fins being affixed to the inner side of said casing, and means for rotating said rings upon the spherical portion to vary the angular relation of an axis extending through said rollers with the axis of said driven shaft.

3. An apparatus as in claim 1 wherein said regulating means comprises an elongated collar surrounding the driven shaft and fixed against rotation exteriorly of said casing and extending inwardly of said casing, an enlarged spherical portion in said collar having a pair of diametrically opposed flattened areas, an inner ring having an opening therein snugly receiving the spherical portion including said flattened areas, an outer ring revoluble upon the inner ring, ball races interposed between the inner and outer rings, a plurality of spaced outwardly extending arms affixed to said outer ring, a connecting rod interconnecting each of said arms with a piston of the fluid pump, a pair of diametrically opposed extensions each affixed to one of said arms, a roller mounted on each extension, a pair of guide fins for each of said rollers, said guide fins being affixed to the inner side of said casing, and means for rotating said rings upon the spherical portion to vary the angular relation of an axis extending through said rollers with the axis of said driven shaft, said last-named means including a segmental gear affixed to and extending from said inner ring, a control collar surrounding the fixed collar and extending into said casing, a lever at the outer end of said control collar, and a gear enmeshed with said segmental gear at the inner end of said control collar.

4. An apparatus as in claim 3 wherein said block is provided with a plurality of annular grooves communicating with each of the cylinders of both said pump and said motor, wherein each of said pistons is provided with a centrally disposed reduced portion, and wherein passageways are provided for interconnecting said grooves.

5. An apparatus as in claim 3 wherein said block is provided with a plurality of annular grooves communicating with each of the cylinders of both said pump and said motor, wherein each of said pistons is provided with a centrally disposed reduced portion, and wherein passageways are provided for interconnecting said grooves, said block having a plurality of annular grooves communicating with each of the cylinders of both said pump and said motor, said pistons each provided with a centrally disposed reduced portion, and said block having passageways interconnecting said grooves.

6. An apparatus as in claim 1 wherein said block is provided with a plurality of annular grooves communicating with each of the cylinders of both said pump and said motor, wherein each of said pistons is provided with a centrally disposed reduced portion, and wherein passageways are provided for interconnecting said grooves.

7. An apparatus as in claim 1 wherein said regulating means comprises an elongated collar surrounding the driven shaft and fixed against rotation exteriorly of said casing and extending inwardly of said casing, an enlarged spherical portion in said collar having a pair of diametrically opposed flattened areas, an inner ring having an opening therein snugly receiving the spherical portion including said flattened areas, an outer ring revoluble upon the inner ring, ball races interposed between the inner and outer rings, a plurality of spaced outwardly extending arms affixed to said outer ring, a connecting rod interconnecting each of said arms with a piston of the fluid pump, a pair of diametrically opposed extensions each affixed to one of said arms, a roller mounted on each extension, a pair of guide fins for each of said rollers, said guide fins being affixed to the inner side of said casing, and means for rotating said rings upon the spherical portion to vary the angular relation of an axis extending through said rollers with the axis of said driven shaft, said block having a plurality of annular grooves communicating with each of the cylinders of both said pump and said motor, said pistons each provided with a centrally disposed reduced portion, and said block having passageways interconnecting said grooves.

8. An apparatus as in claim 7 further characterized by the fact that each piston and its associated cylinder control the flow of fluid to and from the cylinder 90° circumferentially removed therefrom.

9. An apparatus as in claim 7 wherein means is provided for returning fluid lost from the interior of said casing.

10. An apparatus as in claim 7 wherein means is provided for returning fluid lost from the interior of said casing, said means including a fixed housing encompassing said casing, a well in the bottom of said casing, a fixed pump within said housing, means interconnecting said pump and casing for driving said pump, an inlet pipe for said pump terminating in said well, a block surrounding said driven shaft and having a transverse passage therethrough, an outlet pipe for said pump terminating at said transverse passage, an annular groove in the driven shaft registering with said transverse passage, a plurality of radial passages extending inwardly from said annular groove, a centrally and longitudinally extending passage in said driven shaft connecting said radial passages and an outlet opening in the driven shaft centrally of the casing.

References Cited in the file of this patent

UNITED STATES PATENTS

| Number | Name | Date |
|---|---|---|
| 1,274,391 | Davis | Aug. 6, 1918 |
| 1,297,734 | Rayburn | Mar. 18, 1919 |
| 1,654,794 | Coyle | Jan. 3, 1928 |
| 1,695,289 | Lee | Dec. 18, 1928 |
| 1,840,873 | Rayburn | Jan. 12, 1932 |
| 1,846,961 | Greening et al. | Feb. 23, 1932 |
| 1,852,335 | Rosen | Apr. 5, 1932 |
| 2,176,401 | Johns | Oct. 17, 1939 |

FOREIGN PATENTS

| Number | Country | Date |
|---|---|---|
| 508,434 | France | July 24, 1920 |
| 621,409 | France | Feb. 5, 1927 |